US011799903B2

(12) United States Patent
Venkataramaiah et al.

(10) Patent No.: US 11,799,903 B2
(45) Date of Patent: Oct. 24, 2023

(54) DETECTING AND PREVENTING ROUTER-SOLICITATION FLOOD ATTACKS

(71) Applicant: ARRIS Enterprises LLC, Suwanee, GA (US)

(72) Inventors: Srinivasulu Venkataramaiah, Bengaluru (IN); Kiran Kumar Naraharisetty, Bangalore (IN); Hemant Bhatnagar, Cupertino, CA (US); Kishor Kumar Hosur Nagaraju, Mysore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 274 days.

(21) Appl. No.: 17/378,983

(22) Filed: Jul. 19, 2021

(65) Prior Publication Data

US 2022/0030027 A1    Jan. 27, 2022

Related U.S. Application Data

(60) Provisional application No. 63/054,592, filed on Jul. 21, 2020.

(51) Int. Cl.
*H04L 9/40* (2022.01)
(52) U.S. Cl.
CPC ...... *H04L 63/1458* (2013.01); *H04L 63/0236* (2013.01); *H04L 63/1416* (2013.01); *H04L 63/1425* (2013.01); *H04L 63/20* (2013.01)
(58) Field of Classification Search
CPC ............. H04L 63/1458; H04L 63/0236; H04L 63/1416; H04L 63/1425; H04L 63/20
See application file for complete search history.

(56) References Cited

U.S. PATENT DOCUMENTS

| 2020/0137112 | A1  | 4/2020 | Compton |
| 2020/0162517 | A1* | 5/2020 | Wong ..................... H04W 12/12 |
| 2021/0105300 | A1* | 4/2021 | Garnett ............... H04L 63/1425 |

OTHER PUBLICATIONS

Dynamic IPv6 Activation based Defense for IPv6 Router Advertisement Flooding (DoS) Attack, 2014 IEEE, 5 pages, by Goel et al. (Year: 2014).*

(Continued)

*Primary Examiner* — Oleg Korsak
(74) *Attorney, Agent, or Firm* — Steven Stupp; Stewart Wiener

(57) ABSTRACT

An electronic device may receive a control packet from the second electronic device with a request for information about a router. Then, the electronic device may provide a response to the second electronic device with the information about the router, where the response is provided using unicast communication. Next, the electronic device may receive an optional acknowledgment from the second electronic device. Furthermore, the electronic device may store response information that indicates the response was provided to the second electronic device and the optional acknowledgment was received. When the electronic device receives one or more subsequent control packets from the second electronic device with the request for the information about the router, the electronic device may determine that there is malicious activity based at least in part on the response information and may perform a remedial action.

20 Claims, 4 Drawing Sheets

(56) References Cited

OTHER PUBLICATIONS

Detection of Neighbor Solicitation and Advertisement Spoofing in IPv6 Neighbor Discovery Protocol, SIN'11, Nov. 14-19, 2011, pp. 111-118, by Barbhuiya et al. (Year: 2011).*
"Notification of Transmittal of the International Search Report and the Written Opinion of the International Searching Authority, or the Declaration for corresponding International Application No. PCT/US2021/042135, dated Oct. 26, 21, (8 pages)".

* cited by examiner

DETECTING AND PREVENTING ROUTER-SOLICITATION FLOOD ATTACKS

CROSS REFERENCE TO RELATED APPLICATIONS

This application claims priority under 35 U.S.C. 119(e) to: U.S. Provisional Application Ser. No. 63/054,592, "Detecting and Preventing Router-Solicitation Flood Attacks," filed on Jul. 21, 2020, by Srinivasulu Venkataramaiah et al., the contents of which are herein incorporated by reference.

FIELD

The described embodiments relate to techniques for detecting and/or preventing a router-solicitation flood attack in a wireless local area network (WLAN).

BACKGROUND

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

Wireless public hotspots in a WLAN based on an IEEE 802.11 standard usually have open authentication. Therefore, any Wi-Fi-compatible electronic device (which are sometimes referred to as a 'station' or a 'client') can connect to these WLANs. However, this capability makes these WLANs vulnerable to various types of denial-of-service (DOS) attacks.

For example, in a network that is compatible with Internet Protocol version 6 (IPv6), most of the control traffic (such as a neighbor solicitation, a neighbor advertisement, a router solicitation, a router advertisement, etc.) is communicated using multicast packets. Typically, a multicast packet is transmitted at the basic data rate of the least capable electronic device in the WLAN. Consequently, when there is too much multicast traffic, an excessive amount of airtime may be consumed and the communication performance in the WLAN may be degraded. Thus, a malicious actor can use IPv6 control packets (including a router solicitation) in public hotspots to perform an intentional DOS attack and to undermine security in a WLAN.

SUMMARY

An electronic device (such as an access point) that detects a router-solicitation flood attack is described. This electronic device includes an interface circuit that wirelessly communicates with a second electronic device. During operation, the electronic device receives, at the interface circuit, a control packet from the second electronic device with a request for information about a router. Then, the electronic device accesses information about the router based at least in part on the control packet. Moreover, the electronic device provides, from the interface circuit, a response to the second electronic device with the information about the router, where the response is provided using unicast communication. Next, the electronic device receives, at the interface circuit, an acknowledgment from the second electronic device. Furthermore, the electronic device stores response information that indicates that the response was provided to the second electronic device and the acknowledgment was received. When the electronic device receives, at the interface circuit, one or more subsequent control packets from the second electronic device with the request for the information about the router, the electronic device determines that there is malicious activity based at least in part on the response information and performs a remedial action.

Note that the control packet may include a router solicitation.

Moreover, the router solicitation may be compatible with IPv6.

Furthermore, the malicious activity may include a router-solicitation flood attack.

Additionally, the remedial action may include: provide a message (such as an alert) to a controller and/or to one or more additional access points in the WLAN. Moreover, the electronic device may de-authenticate the second electronic device from the WLAN, so that the second electronic device is disconnected from the WLAN.

In some embodiments, the information about the router includes an IP address of the router and/or specification information for the router.

Moreover, prior to receiving the control packet, the electronic device may receive, at the interface circuit, a router advertisement from the router, where the router advertisement is communicated using broadcast communication, and the router advertisement includes the information about the router. Then, the electronic device may store the information.

Another embodiment provides a computer-readable storage medium for use with the electronic device. This computer-readable storage medium may include program instructions that, when executed by the electronic device, cause the electronic device to perform at least some of the aforementioned operations.

Another embodiment provides a method. This method includes at least some of the operations performed by the electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device (such as an access point) that detects a router-solicitation flood attack is described. During operation, the electronic device may receive a control packet from a second electronic device with a request for information about a router. Then, the electronic device may access information about the router based at least in part on the control packet. Moreover, the electronic device may provide a response to the second electronic device with the information about the router, where the response is provided using unicast communication. Next, the electronic device may receive an optional acknowledgment from the second electronic device. Furthermore, the electronic device may store response information that indicates the response was provided to the second electronic device and the optional acknowledgment was received. When the electronic device receives one or more subsequent control packets from the second electronic device with the request for the information about the router, the electronic device may determine that there is malicious activity based at least in part on the response information and may perform a remedial action.

By detecting the malicious activity (such as a router-solicitation flood attack) and performing the remedial action, the communication techniques may protect the WLAN (and an associated wired network). For example, the communication techniques may stop the malicious activity. This may maintain the communication performance and may enhance security in the WLAN. Consequently, the communication techniques may improve the user experience and customer satisfaction when communicating using the WLAN and/or using the electronic device.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Tex.), Bluetooth® (from the Bluetooth Special Interest Group of Kirkland, Wash.), and/or another type of wireless interface (such as another wireless-local-area-network interface). Moreover, an access point in the system may communicate with a controller or services using a wired communication protocol, such as a wired communication protocol that is compatible with an Institute of Electrical and Electronics Engineers (IEEE) 802.3 standard (which is sometimes referred to as 'Ethernet'), e.g., an Ethernet II standard. However, a wide variety of communication protocols may be used in the system, including wired and/or wireless communication. In the discussion that follows, Ethernet and Wi-Fi are used as illustrative examples.

Figure 1:
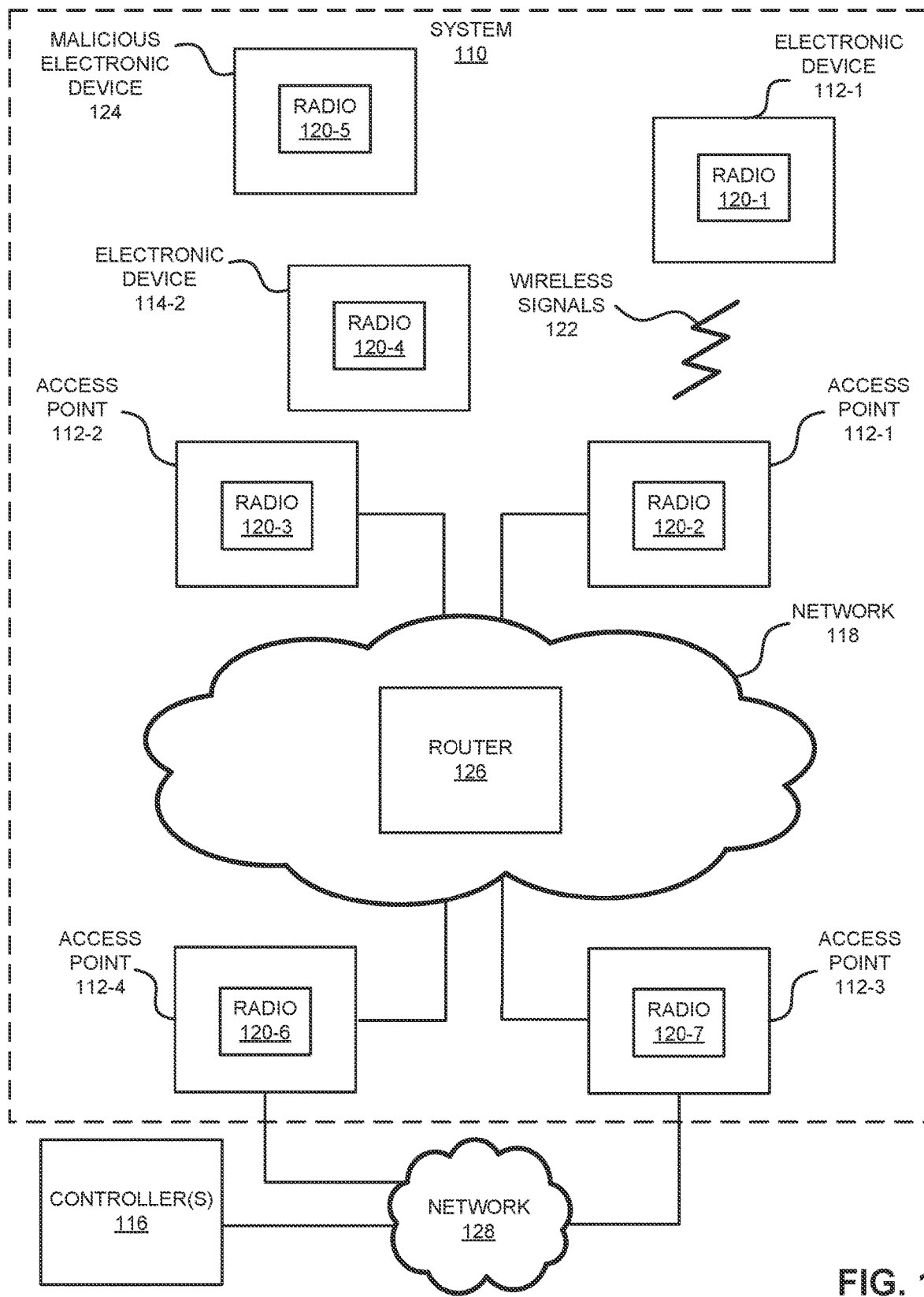
FIG. 1 is a block diagram illustrating a system in accordance with an embodiment of the present disclosure.

We now describe some embodiments of the communication techniques. FIG. 1 presents a block diagram illustrating an example of a system 110, which may include components, such as: one or more access points 112, one or more electronic devices 114 (such as cellular telephones, stations, another type of electronic device, etc.), and one or more optional controllers 116. In system 110, the one or more access points 112 may wirelessly communicate with the one or more electronic devices 114 using wireless communication that is compatible with an IEEE 802.11 standard. Thus, the wireless communication may occur in a 2.4 GHz, a 5 GHz and/or a 60 GHz frequency band. (Note that IEEE 802.11ad communication over a 60 GHz frequency band is sometimes referred to as 'WiGig.' In the present discussion, these embodiments also encompassed by 'Wi-Fi.') However, a wide variety of frequency bands may be used.

Moreover, wired and/or wireless communication among access points 112 in a WLAN may occur via network 118 (such as an intra-net, a mesh network, point-to-point connections and/or the Internet) and may use a network communication protocol, such as Ethernet. This network may include one or more routers and/or switches, such as router 126.

As noted previously, the one or more access points 112 and the one or more electronic devices 114 may communicate via wireless communication. Notably, one or more of access points 112 and one or more of electronic devices 114 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

In some embodiments, the wired and/or wireless communication among access points 112 also involves the use of dedicated connections, such as via a peer-to-peer (P2P) communication technique. Therefore, access points 112 may support wired communication within the WLAN (such as Ethernet) and wireless communication within the WLAN (such as Wi-Fi), and one or more of access points 112 may also support a wired communication protocol (such as Ethernet) for communicating via network 128 (such as the Internet) with other electronic devices, such as a computer or the one or more optional controllers 116 of the WLAN. Note that the one or more optional controllers 116 may be at the same location as the other components in system 110 or may be located remotely (i.e., at a different location). Moreover, note that the one or more access points 112 may be managed by the one or more optional controllers 116. Furthermore, note that the one or more access points 112 may be a physical access point or a virtual or 'software' access point that is implemented on a computer or an electronic device.

Figure 4:
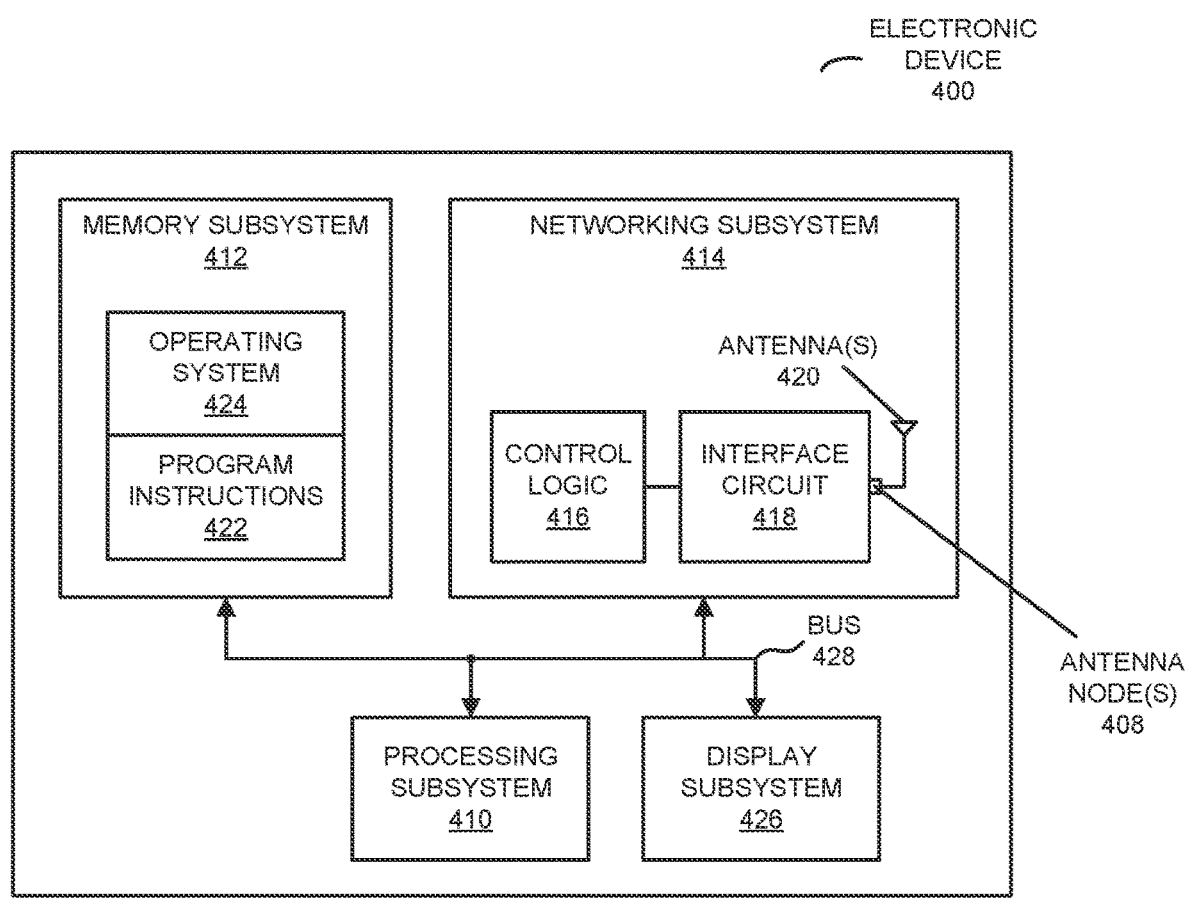
FIG. 4 is a block diagram illustrating an electronic device in accordance with an embodiment of the present disclosure.

As described further below with reference to FIG. 4, the one or more access points 112, the one or more electronic devices 114 and/or the one or more optional controllers 116 may include subsystems, such as a networking subsystem, a memory subsystem and a processor subsystem. In addition, the one or more access points 112 and the one or more electronic devices 114 may include radios 120 in the networking subsystems. More generally, the one or more access points 112 and the one or more electronic devices 114 can include (or can be included within) any electronic devices with the networking subsystems that enable the one or more access points 112 and the one or more electronic devices 114 to wirelessly communicate with each other.

As can be seen in FIG. 1, wireless signals 122 (represented by a jagged line) are transmitted from a radio 120-1 in electronic device 114-1. These wireless signals are received by radio 120-2 in at least one of the one or more access points 112, such as access point 112-1. In particular, electronic device 114-1 may transmit frames or packets. In turn, these frames or packets may be received by access point 112-1. This may allow electronic device 114-1 to communicate information to access point 112-1. Note that the communication between electronic device 114-1 and access point 112-1 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 120 are shown in the one or more electronic devices 114 and the one or more access points 112, one or more of these instances may be different from the other instances of radios 120.

As noted previously, system 110 may include a malicious electronic device 124. The presence of malicious electronic device 124 may adversely impact security and/or the communication performance in system 110. Note that a 'malicious electronic device' may attempt to disable system 110 (or reduce the communication performance in the WLAN) and/or may pose a security risk to other electronic devices in system 110. For example, malicious electronic device 124 may attempt to perform a router-solicitation flood attack.

Notably, router 126 may broadcast one or more router advertisements. Moreover, after associating with one of access points 112 (such as access point 112-1), an electronic device (such as electronic device 114-1) may provide a router solicitation to router 126 to request information about router 126 (such as router-configuration information and/or an IP address of router 126). Then, in response to the router solicitation, router 126 may broadcast a response (such as an instance of the router advertisement) with the information about router 126, which, as described further below, may be communicated to electronic device 114-1 by access point 112-1.

In some embodiments (such as embodiments that are compatible with IPv6), one or more of access points 112 (such as access point 112-1) may act as a proxy for router 126. For example, access point 112-1 may receive a router advertisement that is broadcast by router 126, and access point 112-1 may store the information about router 126. Then, in response to a router solicitation from electronic device 114-1, access point 112-1 may unicast a response with the router information to electronic device 114-1.

However, after receiving the response, malicious electronic device 124 may repeatedly provide router solicitations, e.g., to access point 112-1. These router solicitations, which are referred to as a 'router-solicitation flood attack', may degrade the communication performance of the WLAN.

In order to address this challenge, the one or more access points 112 (such as access point 112-1) may implement or use the communication techniques. Notably, as discussed further below with reference to FIGS. 2 and 3, during the communication techniques access point 112-1 may receive a router solicitation (and, more generally, a control packet) from malicious electronic device 124 with a request for information about router 126. In response, access point 112-1 may access information about router 126. Then, access point 112-1 may unicast a response to malicious electronic device 124 with the information about the router, and access point 112-1 may receive an acknowledgment from malicious electronic device 124. Next, access point 112-1 may store response information that indicates the response was provided to malicious electronic device 124 and the acknowledgment was received. When access point 112-1 receives one or more subsequent router solicitations (and, more generally, control packets) from malicious electronic device 124 with the request for the information about router 126, access point 112-1 may determine that there is malicious activity based at least in part on the response information and may perform a remedial action. For example, access point 112-1 may determine that malicious electronic device 124 is attempting a router-solicitation flood attack. Furthermore, the remedial action may include: providing a message (such as an alert) to at least one of controllers 116; providing a second message (such as an alert) to an additional access point in the WLAN (such as access point 112-2); and/or de-authenticating malicious electronic device 124 from the WLAN, so that malicious electronic device 124 is disconnected from the WLAN.

In some cases, the malicious electronic device 124 may be programmed to not provide an acknowledgement to access point 112-1 in an effort to thwart the above-described communication techniques for detecting that electronic device 124 is a malicious electronic device. Consequently, in some embodiments, access point 112-1 (or another electronic device performing the communication technique) may include a counter that counts the number of times that it receives a router solicitation from a particular electronic device (e.g., malicious electronic device 124) and then does not receive an acknowledgement from malicious electronic device 124 after providing the response with the information about the router to malicious electronic device 124. The count information may comprise part of the response information stored by access point 112-1. If this occurs more than a pre-selected number of times within a selected time interval (e.g., two, five, ten or more times within 10 s, 1 minute, 10 minutes, etc.), the access point 112-1 (or the other electronic device performing the communication techniques) may determine that malicious electronic device 124 is attempting a router-solicitation flood attack based at least in part on the response information and may perform a remedial action as described above.

In this way, the communication techniques may detect a router-solicitation flood attack in the WLAN. This may allow appropriate remedial action to be taken, such as warning other electronic devices and/or access points in the WLAN and/or excluding malicious electronic device 124 from system 110. The remedial action may reduce or eliminate harm caused by malicious electronic device 124. Therefore, communication techniques may improve the security and/or the communication performance in system 110.

In the described embodiments, processing a frame or a packet in the electronic devices and/or the one or more access points may include: receiving wireless signals 122 with the frame or packet; decoding/extracting the frame or packet from the received wireless signals 122 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 112, the one or more electronic devices 114, the one or more optional controllers 116 and/or malicious electronic device 124. As another example, in another embodiment, different electronic devices are transmitting and/or receiving frames or packets.

Figure 2:
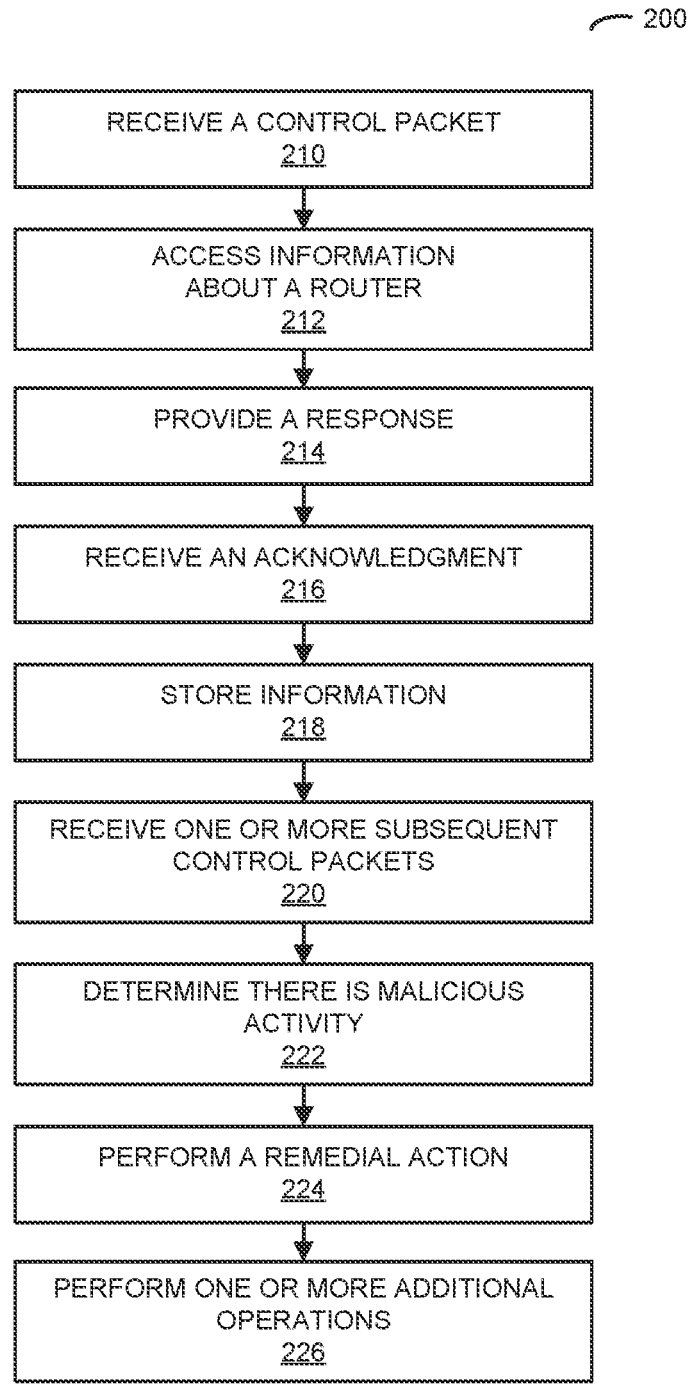
FIG. 2 is a flow diagram illustrating a method for detecting a router-solicitation flood attack in the system in FIG. 1 in accordance with an embodiment of the present disclosure.

We now describe embodiments of the method. FIG. 2 presents a flow diagram illustrating an example of a method 200 for detecting a router-solicitation flood attack. Moreover, method 200 may be performed by an electronic device, such as one of the one or more access points 112 in FIG. 1, e.g., access point 112-1. During operation, the electronic device may receive a control packet (operation 210) from the second electronic device with a request for information about a router. Note that the control packet may include a router solicitation. For example, the router solicitation may be compatible with IPv6. Moreover, the information about the router may include an IP address of the router and/or specification information for the router.

Then, the electronic device may access information about the router (operation 212) based at least in part on the control packet. Moreover, the electronic device may provide a response (operation 214) to the second electronic device with the information about the router, where the response is provided using unicast communication. Next, the electronic device may receive an optional acknowledgment (operation 216) from the second electronic device. Furthermore, the electronic device may store response information (operation 218) that indicates that the response was provided to the second electronic device and the optional acknowledgment was received. As discussed previously, in some cases the electronic device may not receive an acknowledgment. In such cases, the electronic device may store additional response information (such as, e.g., a count of the number times that a response with the information was provided to the second electronic device without receiving an acknowledgement) in order to identify malicious electronic devices that are programmed to not provide acknowledgements.

When the electronic device receives one or more subsequent control packets (operation 220) from the second electronic device with the request for the information about the router, the electronic device may determine that there is malicious activity (operation 222) based at least in part on the stored response information and may perform a remedial action (operation 224). For example, the electronic device may determine that there is malicious activity when two or three subsequent control packets are received from the second electronic device with the request for the information about the router. Note that the malicious activity may include a router-solicitation flood attack. Moreover, the remedial action may include: providing a message (such as an alert) to a controller; providing a second message (such as an alert) to one or more additional access points in the WLAN (such as one or more neighboring access points); and/or de-authenticating the second electronic device from the WLAN, so that the second electronic device is disconnected from the WLAN.

In some embodiments, the electronic device optionally performs one or more additional operations (operation 226). For example, prior to receiving the control packet (operation 210), the electronic device may receive, at the interface circuit, a router advertisement from the router, where the router advertisement is communicated using broadcast communication, and the router advertisement includes the information about the router. Then, the electronic device may store the information about the router.

In some embodiments of method 200, there may be additional or fewer operations. Moreover, the order of the operations may be changed, and/or two or more operations may be combined into a single operation.

For example, while FIG. 2 illustrates the electronic device performing the operations in method 200, in other embodiments at least some of the operations in method 200 are performed by the controller. Notably, the controller may store the information about the router and/or the response information. In these embodiments, the electronic device may request the information about the router and/or the response information. Thus, in some embodiments of method 200, storage may be local and/or remotely located (such as a cloud-based controller). Moreover, while FIG. 2 illustrates the use of method 200 in a WLAN, in other embodiments method 200 may be used in a wired network.

Figure 3:
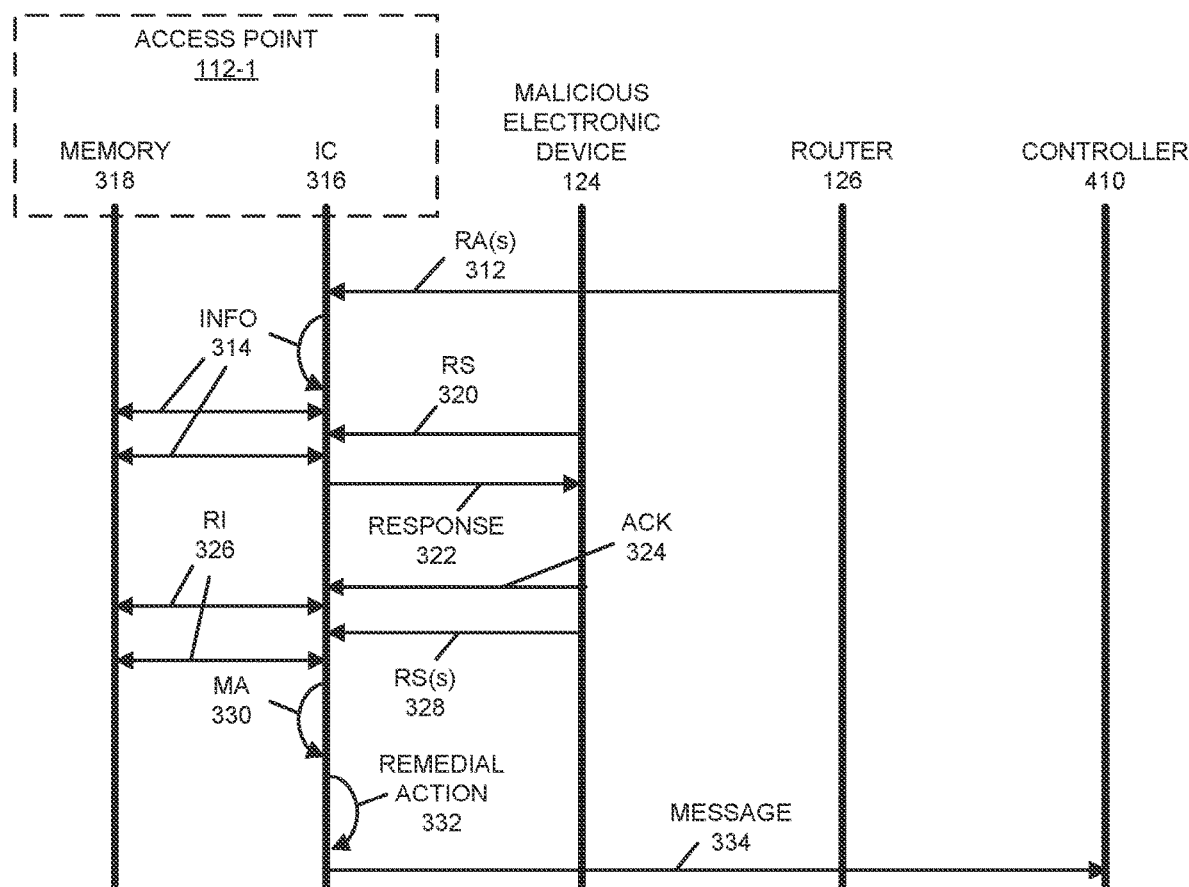
FIG. 3 is a drawing illustrating an example of communication among electronic devices in FIG. 1 in accordance with an embodiment of the present disclosure.

Embodiments of the communication techniques are further illustrated in FIG. 3, which presents a drawing illustrating an example of communication between access point 112-1, malicious electronic device 124, router 126 and controller 310 according to some embodiments. Notably, router 126 may broadcast one or more router advertisements (RA) 312 with information 314 about router 126. This router advertisement may be received by interface circuit (IC) 316 in access point 112-1 (which, as described further below, may forward the one or more router advertisements 312 to malicious electronic device 124 via response 322 after receiving router solicitation 320). In response, interface circuit 316 may extract information 314 and may store information 314 in memory 318 in access point 112-1 (such as a cache in access point 112-1).

Moreover, malicious electronic device 124 may provide a router solicitation (RS) 320 to access point 112-1 with a request for information 314 about router 126. After receiving router solicitation 320, interface circuit 316 may access information 314 in memory 318. Then, interface circuit 316 may provide a response 322 to malicious electronic device 124 with information 314 about router 126, where response 322 is provided using unicast communication.

Furthermore, after receiving response 322, malicious electronic device 124 may provide an optional acknowledgment (ACK) 324 to access point 112-1. Next, interface circuit 316 may store response information (RI) 326 in memory 318. This response information may indicate that response 322 was provided and that optional acknowledgment 324 was received. For example, response information 326 may include an identifier of malicious electronic device 124 (such as a media access control address or an association identifier of malicious electronic device 124) and a timestamp when response 322 was successfully provided to malicious electronic device 124. While not shown in FIG. 3, in the event that malicious electronic device 124 does not provide the acknowledgment 324 to access point 112-1, access point 112-1 may track the number of times that malicious electronic device 124 provides a router solicitation 320 to access point 112-1 without providing the acknowledgment 324 after access point 112-1 provides response 322 with information 314 about router 126 to malicious electronic device 124. The tracked information regarding the number of times that malicious electronic device 124 provides a router solicitation 320 to access point 112-1 without providing the acknowledgment 324 may be stored by access point 112-1 as part of the response information 326 that is stored in memory 318.

Subsequently, malicious electronic device 124 may provide one or more additional router solicitations 328 to access point 112-1 with the request for information 314 about router 126. When interface circuit 316 receives the one or more router solicitations 328, interface circuit 316 may access the stored response information 326. Moreover, when response information 326 indicates that access point 112-1 previously successfully provided information 326 to malicious electronic device 124 (or, alternatively, that access point 112-1 previously provided response 322 to malicious electronic device 124 a pre-selected number of time without receiving an acknowledgment), interface circuit 316 may determine that there is malicious activity (MA) 330 (such as a router-solicitation flood attack), and may perform a remedial action 332, such as providing a message 334 (such as an alert or warning) to controller 310.

While FIG. 3 illustrates communication between components using unidirectional or bidirectional communication with lines having single arrows or double arrows, in general the communication in a given operation in this figure may involve unidirectional or bidirectional communication.

In some embodiments of the communication techniques, an access point that is compatible with an IPv6 network deployment may maintain a cache of the router advertisements in the network. Moreover, the access point may provide a unicast response to a router solicitation from the associated client with a unicast router advertisement from this cache. Furthermore, the access point may maintain an entry when it responds to the router solicitation from the associated client.

The client should not send additional router solicitations when it has acknowledged receiving the unicast router advertisement from the access point. Therefore, when one or more additional router solicitations are received from the associated client after the acknowledgment for the unicast router advertisement was received, the access point may determine that this is malicious activity and may raise an alarm to notify the network administrator. Likewise, the client should not send more than a pre-selected number of router solicitations (e.g., within a pre-selected time period). Therefore, when more than the pre-selected number of router solicitations are received from the associated client without receiving any acknowledgment for the unicast router advertisements that are provided in response thereto, the access point may determine that this is malicious activity and may raise an alarm to notify the network administrator. In some embodiments, after determining that malicious activity is occurring, the access point may send a unicast de-authentication message to the client to prevent the malicious activity or flood attacks from the client.

Thus, the access point may detect and prevent router-solicitation flood attacks by storing the router advertisements sent by a router in a network. Then, when a wireless client sends a router solicitation (such as after associating with the access point), the access point may provide a unicast router advertisement to the client. Thus, the access point may be a proxy acting on behalf of the router, and may drop the router solicitation at the access point (so the router solicitation is not communicated through a WLAN and/or a network to the router). Moreover, for each client, the access point may maintain an entry when it has successfully provided the unicast router advertisement to the client.

When one or more subsequent router solicitations are received from the client (e.g., within a short span of time, such as 10 s, 1 min or 10 min), a router-solicitation flood attack may be occurring. Therefore, when the access point receives a subsequent router solicitation from the client, the access point may check for the entry. When the entry is present for the client and the access point continues to receive a router solicitation from the client, the access point may determine that there is malicious activity and may send an alarm to notify a controller or other electronic devices in a WLAN about this incident. Alternatively or additionally, the access point may send a unicast de-authentication message to the client in the WLAN. These remedial actions may prevent further damage to the WLAN by this malicious client.

Consequently, the communication techniques may offer enhanced protection from router-solicitation flood attacks. This capability may reduce or eliminate an impact of such attacks. For example, the communication techniques may improve security and/or communication performance in a WLAN and/or another network (such as a wired network).

We now describe embodiments of an electronic device, which may perform at least some of the operations in the communication techniques. For example, the electronic device may include a component in system 110, such as one of: the one or more access points 112, the one or more electronic devices 114 and/or the one or more optional controllers 116. FIG. 4 presents a block diagram illustrating an electronic device 400 in accordance with some embodiments. This electronic device includes processing subsystem 410, memory subsystem 412, and networking subsystem 414. Processing subsystem 410 includes one or more devices configured to perform computational operations. For example, processing subsystem 410 can include one or more microprocessors, ASICs, microcontrollers, programmable-logic devices, graphical processor units (GPUs) and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory (which collectively or individually are sometimes referred to as a 'computer-readable storage medium'). In some embodiments, instructions for processing subsystem 410 in memory subsystem 412 include: one or more program modules or sets of instructions (such as program instructions 422 or operating system 424), which may be executed by processing subsystem 410. Note that the one or more computer programs may constitute a computer-program mechanism. Moreover, instructions in the various program instructions in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 and one or more antennas 420 (or antenna elements). (While FIG. 4 includes one or more antennas 420, in some embodiments electronic device 400 includes one or more nodes, such as nodes 408, e.g., a pad, which can be coupled to the one or more antennas 420. Thus, electronic device 400 may or may not include the one or more antennas 420.) For example, networking subsystem 414 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 400 may be adapted or changed using pattern shapers (such as reflectors) in one or more antennas 420 (or antenna elements), which can be independently and selectively electrically coupled to ground to steer the transmit antenna radiation pattern in different directions. Thus, if one or more antennas 420 includes N antenna-radiation-pattern shapers, the one or more antennas 420 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 4 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 400 may use the mechanisms in networking subsystem 414 for performing simple wireless communication between the electronic devices, e.g., transmitting frames and/or scanning for frames transmitted by other electronic devices.

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections among the subsystems.

In some embodiments, electronic device 400 includes a display subsystem 426 for displaying information on a display, which may include a display driver and the display, such as a liquid-crystal display, a multi-touch touchscreen, etc.

Electronic device 400 can be (or can be included in) any electronic device with at least one network interface. For example, electronic device 400 can be (or can be included in): a desktop computer, a laptop computer, a subnotebook/netbook, a server, a computer, a mainframe computer, a cloud-based computer, a tablet computer, a smartphone, a cellular telephone, a smartwatch, a consumer-electronic device, a portable computing device, an access point, a transceiver, a controller, a radio node, a router, a switch, communication equipment, an access point, test equipment, and/or another electronic device.

Although specific components are used to describe electronic device 400, in alternative embodiments, different components and/or subsystems may be present in electronic device 400. For example, electronic device 400 may include one or more additional processing subsystems, memory subsystems, networking subsystems, and/or display subsystems. Additionally, one or more of the subsystems may not be present in electronic device 400. Moreover, in some embodiments, electronic device 400 may include one or more additional subsystems that are not shown in FIG. 4. Also, although separate subsystems are shown in FIG. 4, in some embodiments some or all of a given subsystem or component can be integrated into one or more of the other subsystems or component(s) in electronic device 400. For example, in some embodiments program instructions 422 is included in operating system 424 and/or control logic 416 is included in interface circuit 418.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 414. The integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 422, operating system 424 (such as a driver for interface circuit 418) or in firmware in interface circuit 418. Alternatively or additionally, at least some of the operations in the communication techniques may be implemented in a physical layer, such as hardware in interface circuit 418.

Moreover, while the preceding embodiments illustrated the use of wireless signals in one or more bands of frequencies, in other embodiments of these signals may be communicated in one or more bands of frequencies, including: a microwave frequency band, a radar frequency band, 900 MHz, 2.4 GHz, 5 GHz, 60 GHz, and/or a band of frequencies used by a Citizens Broadband Radio Service or by LTE. In some embodiments, the communication between electronic devices uses multi-user transmission (such as orthogonal frequency division multiple access or OFDMA).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to wirelessly communicate with a second electronic device, wherein the electronic device is configured to:
receive, at the interface circuit, a control packet associated with the second electronic device, wherein the control packet comprises a request for information about a router;
access the information about the router based at least in part on the control packet;
provide, from the interface circuit, a response addressed to the second electronic device with the information about the router, wherein the response is provided using unicast communication;
store response information that indicates that the response was provided to the second electronic device;
receive, at the interface circuit, one or more subsequent control packets associated with the second electronic device, wherein the one or more subsequent control packets comprise the request for the information about the router;
determine that there is malicious activity based at least in part on the one or more subsequent control packets and the response information; and
perform a remedial action.

2. The electronic device of claim 1, wherein the electronic device comprises an access point.

3. The electronic device of claim 1, wherein the control packet comprises a router solicitation.

4. The electronic device of claim 3, wherein the router solicitation is compatible with Internet Protocol version 6 (IPv6).

5. The electronic device of claim 1, wherein the malicious activity comprises a router-solicitation flood attack.

6. The electronic device of claim 1, wherein the remedial action comprises one or more of: providing a message to a controller; providing a second message to a second access point; or de-authenticating the second electronic device from a wireless local area network (WLAN), so that the second electronic device is disconnected from the WLAN.

7. The electronic device of claim 1, wherein the information about the router comprises one or more of: an Internet Protocol (IP) address of the router, or specification information for the router.

8. The electronic device of claim 1, wherein, prior to receiving the control packet, the electronic device is configured to:
receive, at the interface circuit, a router advertisement from the router, wherein the router advertisement is communicated using broadcast communication, and the router advertisement includes the information about the router; and
store the information about the router.

9. The electronic device of claim 1, wherein the electronic device is further configured to receive, at the interface circuit, an acknowledgment associated with the second electronic device; and wherein the stored response information further comprises an indication that the acknowledgment was received.

10. The electronic device of claim 1, wherein the electronic device is further configured to count a number of times that responses addressed to the second electronic device with the information about the router were provided without receiving acknowledgments from the second electronic device; and wherein the determination that there is malicious activity is based at least in part on the count.

11. A non-transitory computer-readable storage medium for use in conjunction with an electronic device, the computer-readable storage medium storing program instructions that, when executed by the electronic device, cause the electronic device to perform operations, comprising:

receiving, at an interface circuit in the electronic device, a control packet associated with a second electronic device, wherein the control packet comprises a request for information about a router;

accessing the information about the router based at least in part on the control packet;

providing, from the interface circuit, a response addressed to the second electronic device with the information about the router, wherein the response is provided using unicast communication;

storing response information that indicates that the response was provided to the second electronic device;

receiving, at the interface circuit, one or more subsequent control packets associated with the second electronic device, wherein the one or more subsequent control packets comprise the request for the information about the router;

determining that there is malicious activity based at least in part on the one or more subsequent control packets and the response information; and performing a remedial action.

12. The non-transitory computer-readable storage medium of claim 11, wherein the control packet comprises a router solicitation.

13. The non-transitory computer-readable storage medium of claim 12, wherein the router solicitation is compatible with Internet Protocol version 6 (IPv6).

14. The non-transitory computer-readable storage medium of claim 11, wherein the malicious activity comprises a router-solicitation flood attack.

15. The non-transitory computer-readable storage medium of claim 11, wherein the remedial action comprises one or more of: providing a message to a controller; providing a second message to a second access point; or de-authenticating the second electronic device from a wireless local area network (WLAN), so that the second electronic device is disconnected from the WLAN.

16. The non-transitory computer-readable storage medium of claim 11, wherein the information about the router comprises one or more of: an Internet Protocol (IP) address of the router, or specification information for the router.

17. The non-transitory computer-readable storage medium of claim 11, wherein, prior to receiving the control packet, the operations comprise:

receiving, at the interface circuit, a router advertisement from the router, wherein the router advertisement is communicated using broadcast communication, and the router advertisement includes the information about the router; and storing the information about the router.

18. The non-transitory computer-readable storage medium of claim 11, wherein the operations comprise receiving, at the interface circuit, an acknowledgment associated with the second electronic device; and wherein the stored response information further comprises an indication that the acknowledgment was received.

19. The non-transitory computer-readable storage medium of claim 11, wherein the operations comprise counting a number of times that responses addressed to the second electronic device with the information about the router were provided without receiving acknowledgments from the second electronic device; and wherein the determination that there is malicious activity is based at least in part on the count.

20. A method for detecting a router-solicitation flood attack, comprising:

by an electronic device:

receiving, at an interface circuit in the electronic device, a control packet associated with a second electronic device, wherein the control packet comprises a request for information about a router;

accessing the information about the router based at least in part on the control packet;

providing, from the interface circuit, a response addressed to the second electronic device with the information about the router, wherein the response is provided using unicast communication;

storing response information that indicates that the response was provided to the second electronic device;

receiving, at the interface circuit, one or more subsequent control packets associated with the second electronic device, wherein the one or more subsequent control packets comprise the request for the information about the router;

determining that there is malicious activity based at least in part on the one or more subsequent control packets and the response information; and performing a remedial action.

* * * * *